United States Patent [19]

Reddy et al.

[11] Patent Number: 5,132,193
[45] Date of Patent: Jul. 21, 1992

[54] GENERATION OF ELECTRICITY WITH FUEL CELL USING ALCOHOL FUEL

[75] Inventors: N. R. K. Vilambi Reddy, Andover; Earl J. Taylor, Chelmsford, both of Mass.

[73] Assignee: Physical Sciences, Inc., Andover, Mass.

[21] Appl. No.: 665,789

[22] Filed: Mar. 7, 1991

Related U.S. Application Data

[63] Continuation-in-part of Ser. No. 564,379, Aug. 8, 1990, abandoned.

[51] Int. Cl.$^5$ .................... H01M 4/90; H01M 8/10
[52] U.S. Cl. .................... 429/13; 424/33; 424/40
[58] Field of Search .................... 429/30, 33, 40, 13

[56] References Cited

U.S. PATENT DOCUMENTS

| | | |
|---|---|---|
| 3,239,382 | 3/1966 | Thompson . |
| 3,288,653 | 11/1966 | Holt et al. . |
| 3,343,990 | 9/1967 | Giddy . |
| 3,443,998 | 5/1969 | Shropshire . |
| 3,467,554 | 9/1969 | Forten et al. . |
| 3,506,494 | 4/1970 | Adlhart . |
| 3,510,355 | 5/1970 | Fishman . |
| 3,701,687 | 10/1972 | Grubb et al. . |
| 3,776,776 | 12/1973 | Petrow . |
| 4,127,468 | 11/1978 | Alfenaar et al. . |
| 4,390,603 | 6/1983 | Kawana et al. .................... 429/30 |
| 4,407,905 | 10/1983 | Takeuchi et al. . |
| 4,407,906 | 10/1983 | Stonehart . |
| 4,457,986 | 7/1984 | Bindra et al. . |
| 4,478,917 | 10/1984 | Fujita et al. .................... 429/33 |
| 4,614,692 | 9/1986 | Kajiyama et al. . |
| 4,711,829 | 12/1987 | Luczak et al. . |
| 4,828,941 | 5/1989 | Sterzel .................... 429/33 |

OTHER PUBLICATIONS

Grant, ed. *Hackh's Chemical Dictionary* McGraw-Hill Book Company, New York et al., p. 27, 1980.
McIntyre, J. D. E. et al, "Electrochemistry at Single--Crystal Metal Electrodes, Electrocatalytic . . . on Oxygen Reduction", in: *Electrochemistry and Physics of Electrocatalysis*, Weaver et al., Ed., Weaver et al., The Electrochemical Society PV 84-12, pp. 102-129.
Kinoshita, K., "Small-Particle Effects and Structural Considerations for Electrocatalysis", Chapter 8 in *Modern Aspects of Electrochemistry*, Ed. Bochris et al., pp. 557-566.
R. R. Adzic et al, *Surf Sci.* 94, L191-L194 (1980).
R. R. Adzic et al, *Nature*, 296, 137-138 (1982).
D. S. Cameron et al, *Platinum Metals Rev.* 31, 173-181 (1987).

*Primary Examiner*—Stephen Kalafut

[57] ABSTRACT

In this method, a lower alcohol is oxidized directly (i.e. without reformation) to $CO_2 + H_2O$ at the anode of a fuel cell, and a reducible gas (e.g. air or $O_2$) is reduced at the cathode. High, reasonably constant current densities at low over-voltages can be obtained. The electrolyte is preferably an acidic solid polymer electrolyte, and the anode comprises, as the electrocatalyst, a combination of a Group VIII noble metal with gold having significant Au (111) character. The (111) face of gold crystals (preferably crystals in the size range of about 4 to 15 nm) have been found to be specific for oxidation of intermediate alcohol oxidation products (CO, CHO, COH, HCHO, $CH_3CHO$, etc.) to $CO_2$ or $CO_2 + H_2O$. Thus, the combination of a Group VIII metal such as Pt with Au (111) avoids "poisoning" of the Pt by these intermediate products. Some protection against such "poisoning" is also provided with Au (110), but Au (100) and polycrystalline gold are not considered useful in the electro-oxidation of lower alcohols (particularly methanol and ethanol). If the alcohol "fuel" is methanol, the combination of Group VIII noble metal and Au (111) should be microscopically homogeneous (e.g. Pt/Au cubo-octahedral crystals with a high level of (111) faceting), but if the "fuel" is ethanol, the Group VIII noble metal and the Au (111) can be combined in various ways, including macroscopic homogeneous mixtures and heterogeneous blends.

9 Claims, No Drawings

GENERATION OF ELECTRICITY WITH FUEL CELL USING ALCOHOL FUEL

This is a continuation-in-part of our copending application Ser. No. 07/564,379, filed Aug. 8, 1990, now abandoned.

TECHNICAL FIELD

This invention relates to the generation of electricity by means of the oxidation of an alcohol "fuel" in a fuel cell. An aspect of this invention relates to the use of a fuel cell having gas-diffusion electrodes and a suitable electrolyte, preferably an acidic solid polymer electrolyte, all designed or selected to provide an efficient "direct" (non-reformed) alcohol/air or alcohol/oxygen fuel cell which produces current densities in excess of 50 mA/cm$^2$, preferably in excess of 90 mA/cm$^2$. Still another aspect of this invention relates to the "direct" use of a lower primary alcohol fuel (particularly methanol or ethanol) in a fuel cell, wherein the electrocatalyst employed in the fuel cell anode is resistant to CO or carbonyl or COH or aldehyde poisoning. Still another aspect of this invention relates to a method for generating electricity in a small or compact, on-site, alcohol-fueled fuel-cell electric power plant or source, e.g. a method for powering a portable appliance or an electric vehicle with an alcohol/air or alcohol/oxygen fuel cell

PRIOR ART

So-called "direct" alcohol fuel cells, particularly direct methanol fuel cells (DMFC's) are presently under intense study as possible power plants for electric-powdered vehicles (automobiles, buses, trucks, golf-carts, etc.). It has been known at least since the 1950's that lower primary alcohols, particularly the $C_1$ to $C_5$-primary alcohols can be oxidized directly (i.e. without reformation to $H_2 + CO$ or $H_2 + CO_2$) at the anode of a fuel cell. The recent renewed interest in "direct" alcohol fuel cells has been spurred by persistent automobile exhaust-produced air pollution problems in highly developed nations such as the United States, Japan, and the nations of Western Europe. One approach to the virtual elimination of automobile exhaust pollution is the replacement of all types of internal combustion engines with electric motors, and fuel cells show the greatest technical promise for light-weight, compact, high-density sources of electricity.

Because small size (compactness) is of such crucial importance in electric cells utilized to power wheeled vehicles, the use of reformers is not the ideal way to enable the fuel cell to utilize alcohol fuels. (Reformers typically convert methanol to hydrogen, carbon dioxide and carbon monoxide, and the hydrogen then becomes the fuel fed to the anode of the fuel cell.) Serious technical drawbacks have also been encountered with exotic ways of storing or providing hydrogen, e.g. in the form of readily decomposable metal hydrides. Thus, among the major advantages of a "direct" (non-reformed) alcohol fuel cell is that the cell itself is very compact, and no energy is used up in reformation; moreover the fuel is easily stored in liquid form, is high in hydrogen content (almost as high as in hydrocarbons), is highly reactive in a conventional fuel cell, and is economically viable (at least in the case of the $C_1$–$C_5$ alcohols, particularly methanol and ethanol). In the use of acid-electrolyte direct alcohol fuel cells, the preferred reaction products are carbon dioxide and water, and the carbon dioxide is "rejected" by the electrolyte, so that $CO_2$ removal is automatically provided for. Indeed, acid-electrolyte direct alcohol fuel cells seem to have only one major drawback, but this drawback is a very serious one. Virtually all known catalysts used to catalyze the electro-oxidation of the alcohol at the anode seem to be subject to "poisoning" by intermediate reaction products of alcohol oxidation. As a result, a constant current density at low overvoltage cannot normally be provided by these cells. After a brief period of operation, the current density typically begins a precipitous decline.

The most active catalysts for direct alcohol oxidation appear to be the metals of the second and third triad of Group VIII of the Periodic Table of Elements, particularly platinum. Accordingly, the chemical mechanisms by which platinum is "poisoned" during electro-oxidation of alcohols on a platinum surface have been intensely studied over the last twenty years or so. The most interesting system for study has been the electro-oxidation of methanol to carbon dioxide and water via various reaction intermediates, which intermediates appear to include formaldehyde (HCHO) and formic acid (HCOOH), possibly adsorbed CO ($CO_{ads}$), and possibly adsorbed CHO ($CHO_{ads}$) or —COH (—$COH_{ads}$).

According to one theory, the species —COH is responsible for the rapid diminution of current See D. S. Cameron et al, *Platinum Metals Rev.*, 31. 173–181 (1987), page 175. Another theory is that methanol is oxidized on platinum to a strongly adsorbed species by irreversible dehydrogenation, and the chemisorbed "poison" is $CO_{ads}$. In any event, it is well known that various species containing a carbonyl group can be chemisorbed on platinum. For this reason, it was long ago suggested that gold, which is resistant to "poisoning" by carbonyl groups or carbonyl-containing species, should be somehow utilized in a direct methanol fuel cell catalyst, e.g. in combination with platinum. Accordingly, various types of Au-pt or Au-Pd alloys have been discussed in the fuel cell patent and scientific literature See, for example, U.S. Pat. No. 3,443,998 (Shropshire), issued May 13, 1969, U.S. Pat. No. 3,510,355 (J. H. Fishman), issued May 5, 1970, U.S. Pat. No. 4,614,692 (Kajiyama et al), issued Sep. 30, 1986 (Example 7), Roy et al, Indian J Chemistry, 14A, 315-318 (1976), ibid., 24A, 74–744 (1985), Rao et al, Indian J. Chemistry, 24A. 820-824 (1985).

Recent work on direct methanol fuel cells has centered around alloys or metallic compositions which contain no gold. The Au-Pt alloy concept is no longer considered to be as promising as combinations of platinum with ruthenium and/or tin and/or rhenium and/or titanium and/or osmium, although some work has been done with Pt/Ru/Au systems See D. S. Cameron et al, op. cit., p. 176. There is presently no universally accepted explanation for the "promoting" effect on Pt of metals such as Ru. One theory holds that the Ru forms oxides which are active catalysts for the oxidation of the catalyst "poison" at certain potentials.

Despite recent progress with the Pt/Ru system, significant further improvement in the performance of DMFC's and other direct alcohol fuel cells is needed.

SUMMARY OF THE INVENTION

It has now been discovered that Group VIII metal/gold catalysts can be very effective as anode electrocatalysts in direct alcohol fuel cells, provided the gold is in the form of tiny crystals with a large proportion of exposed Au (111) crystal faces or facets. Preferably the proportion of Au (110) faces is smaller, and it is particularly preferred that the proportion of Au (100) faces be minimized to the utmost extent. The presence of polycrystalline gold is preferably also minimized. In other words, there is a pronounced structure sensitivity for lower alcohol oxidation on gold, particularly in the case of methanol. An Au (111) crystalline gold catalyst can provide a high performance, stable catalyst for the electro-oxidation of methanol to $CO_2$ and $H_2O$ at positive potentials in the range of 500 to 1000 mV (vs. a reversible hydrogen electrode), an admittedly rather high voltage range which could detract from the overall cell voltage ($E_{cell}$). But the presence of the Group VIII noble-metal in the alloy (useful for all $C_1$-$C_5$ primary alcohols, including methanol) or mixture (useful for $C_2$-$C_5$ alcohols) sharply diminishes the need for a high positive potential vs. RHE (reversible hydrogen electrode) and thereby helps to provide a practical anode electrocatalyst for a direct alcohol fuel cell.

Accordingly, this invention relates to a method for generating electricity in a direct alcohol fuel cell wherein the anode of the cell comprises a first, fluid-permeable face and a second face in contact with an electrolyte, preferably an acidic solid polymer electrolyte (s.p.e.), in which the lower primary alcohol is brought into contact with the fluid-permeable face of the anode, thereby permitting the alcohol (which is preferably in vapor form) to penetrate deeply into the cross-section of the anode toward the second face—generally at least as far as the second face and even as far as the electrolyte, so that the alcohol will be in intimate contact with the electrocatalyst on the second face. This electrocatalyst is a particulate metal comprising a noble metal of Group VIII of the Periodic Table of the Elements (preferably platinum) and crystalline gold having a high proportion of exposed Au (111) crystal faces or facets. If the alcohol "fuel" is methanol, the catalytic metal should be substantially an alloy (microscopically homogeneous combination) comprising Pt and Au (111), but in the case of higher alcohols such as ethanol, the catalytic metal can be an unalloyed mixture (a macroscopically homogeneous combination or a heterogeneous blend) comprising Pt and Au (111). The lower primary alcohol is oxidized to carbon dioxide and water at the second face of the anode, "poisoning" by adsorbed reaction intermediates being avoided or minimized. The overall fuel cell reaction is completed by reducing a reducible gas such as air or oxygen at the cathode, resulting in the flow of electricity through the external circuit connecting the cathode to the anode. Cell potentials are adequate (e.g. $E_{cell} > 300$ mV) and stable, reliable current densities in excess of about 50 mA/cm$^2$ (e.g $>90$ mA/cm$^2$) can be achieved.

DETAILED DESCRIPTION OF THE INVENTION

Many of the aspects of this invention are conventional. For example, the overall structure of the fuel cell preferably conforms to known designs, e.g known designs for solid polymer electrolyte (s.p.e ) fuel cells having gas diffusion-type anodes and cathodes capable of providing a three-way interface (gas/electrocatalyst/s.p.e.) for the oxidation of the fuel vapor at the anode and the reduction of air or oxygen to water at the cathode. It is also known to oxidize an alcohol at the anode when the alcohol is in a liquid state or is dissolved in a liquid electrolyte, and a gas diffusion-type anode structure can accommodate a liquid fuel. In this invention it is generally preferred however that the alcohol fuel be vaporized to a gaseous fluid and then fed to the fluid-permeable side of a gas-diffusion anode. This vaporization can be carried out by heating the alcohol fuel directly or by passing an inert carrier gas (e.g. $N_2$) through it.

The structure of a typical gas-diffusion electrode typically comprises (1) a fluid-permeable or "gas" side or face with hydrophobic characteristics imparted by a fluorinated polymer such as polytetrafluoroethylene (PTFE) or polytrifluorochloroethylene or a copolymer of tetrafluoroethylene and a second fluorinated monomer, and (2) a catalytic side or face provided with a particulate electrocatalyst. The catalytic face is in direct contact with a liquid or solid electrolyte. In this invention, solid polymer electrolytes (s.p.e.'s) are preferred because of their excellent "cold start" capabilities and other advantages relating to ease of manufacture and avoidance of evaporation problems. Reliable acidic s.p.e.'s are commercially available, e.g. the sulfonated fluorinated polymer membrane-like materials sold under the trademark NAFION by E. I. duPont deNemours and Co. of Wilmington, DE, U.S.A. Such membrane-like materials have a fluorinated olefin homopolymer or copolymer "backbone" and pendent partially or fully fluorinated hydrocarbon and/or ether chains or groups terminated with acidic groups, preferably —$SO_3H$, but phosphonic acid or boric acid-type groups are also known from the patent literature.

The air or oxygen cathode of a fuel cell used in this invention can, if desired, be conventional in every respect. The electrocatalyst at the cathode is therefore a "supported" Group VIII metal such as Pt, the "support" material being high surface area carbon or the like. However, the electrocatalyst layer deposited on the catalytic face of the anode is believed to be novel and believed to have unique characteristics. The formation of this catalytic layer is described subsequently.

A fully assembled fuel cell used in this invention can have any of the known stack configurations designed for compactness and efficient supply of gaseous fuels and oxidant gas to the fluid-permeable faces of the cathodes and anodes. Any of the conventional means for providing a steady stream or flow of fuel vapor to the anode and reducible gas (e.g. air or oxygen) to the cathode can be used. Electrode leads and external circuitry can also be conventional. Typically, an electric motor will be included in the external circuit.

The Anode Electrocatalyst

Two general types of anode electrocatalyst are contemplated by this invention. One type is simply a mass of crystalline gold particles predominating in Au (111) faces (typically these particles are "supported" either on high-surface area carbon particles or on so-called "conductive ceramic" particles) blended with conventional "supported" platinum particles. The blend can be very intimate, hence macroscopically homogeneous, but alloying (microscopic homogeneity) of Pt and Au (111) is not necessary. However, this physically admixed or blended electrocatalyst is preferred for use only with primary alcohols higher than methanol, most preferably—for economic reasons—ethanol. Alternatively, unsupported, essentially monocrystalline Au (111) particles can be blended with supported or unsupported Pt particles.

The other type of electrocatalytic metal is microscopically homogeneous and more properly called an alloy, since any given metallic particle can include atoms of both gold and platinum. This alloy, which predominates in (111) crystal faces, is useful with any of the $C_1$ to $C_5$ primary alcohol fuels, including $CH_3OH$. Gold and platinum both form face-centered cubic (f.c.c.) crystals, and Au/Pt blends form homogeneous solid solutions in any desired proportions.

Although this invention is not bound by any theory, the following reasons for the distinction between these electrocatalysts is suggested.

Methanol is easily stripped of its hydrogen atoms by a platinum catalyst under electro-oxidation conditions. The result of this proton or free-radical H loss is believed to be strongly chemisorbed carbon and oxygen-containing species (e.g. CO and/or CHO) which are difficult to oxidize further. Such species are so strongly adsorbed on Pt that they will not migrate to another catalytic site (a "site" in this context being an area the size of, say, 1.5 to 10 nanometers or 15 to 100A), but if Au (111) is present at the site, further oxidation to $CO_2$ or $CO_2 + H_2O$ can occur. This further oxidation reverses or prevents any "poisoning", hence the oxidation reaction continues unabated.

The cyclic voltammagram for the electro-oxidation of ethanol in platinum appears to be very analogous to that for methanol. However, the similarity of these cyclic voltammagrams may be somewhat deceptive. The mechanism of ethanol electro-oxidation is believed to include the following steps:

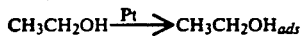

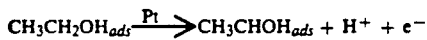

Fortunately, the adsorbed acetaldehyde ($CH_3CHO_{ads}$) is relatively easily displaced from the catalytic site, e.g. by a flow of incoming ethanol molecules. Accordingly, it is only necessary that the Au (111) crystal face be nearby, not that it be part of the site.

Although microscopic single crystals of gold and platinum can be used in this invention, it is preferred that the Au/Pt alloy mixture be "supported" by high surface area carbon or high surface area electrically conductive oxides or ceramics and the like. Suitable finely-divided carbons are commercially available in B.E.T. surface areas ranging from 50 $m^2$ per gram to >1000 $m^2/g$ and even approaching 2000 $m^2/g$. The carbon can be graphitized to make it more corrosion-resistant. Conductive oxides preferably have surface areas >50 $m^2/g$ also. Preferred conductive oxides are sub-oxides of titanium. To make the admixture type of catalyst, the high surface area carbon is preferably suspended in a polar solvent comprising water and a lower aliphatic alcohol such as isopropyl alcohol. Reducible gold salts or acids such as gold (III) chloride or chloroauric acid ($HAuCl_4$) and reducible Pt salts such as platinum chloride, chloroplatinic acid, etc. will dissolve in the polar solvent, and the carbon will be impregnated with the dissolved salt or acid. Separate batches of carbon, one impregnated with gold-containing ions and one impregnated with platinum-containing ions are each dried (e.g. at room temperature), and the salt and/or acid of each batch is reduced to the corresponding metal on the surface of the carbon particles with flowing (preferably dry) hydrogen gas. Thus, a batch of Pt/C (supported Pt) and a separate batch of Au/C (supported Au) are made. The Pt/C is ready to be mixed into the electrocatalyst, but the Au/C is not, since the submicroscopic Au monocrystals supported on the carbon particles (the Au crystals can average in size from about 1 to 4 nm, i.e. 10 to 40 A) are characterized by a high percentage of Au (100) crystal faces. Theoretical studies suggest that very tiny platinum or gold particles (e.g. 1–3 nm in size) tend to predominate in (100) faces, or the functional equivalent of such faces, particulalry in the size range of 1 to 2 nm, which particles are so small that it is difficult even to form a complete f.c.c. crystal. Theories also hold that a cubo-octahedral crystalline structure will have a maximum number of (111) faces at 45 A (4.5 nm). Accordingly, the Au/C particles are sintered at elevated temperatures to increase the particle size to >40 A and less than about 150 A to maximize the occurrence of Au (111) and Au (110) faces, particularly Au (111) faces or faceting. The Au/C can then be mixed with the Pt/C to provide an electrocatalyst especially suited to the electro-oxidation of ethanol.

To make the desired Pt/Au alloy, Pt (111) "seeding" is effected, or Pt and Au compounds (e.g. a mixture of chloroauric and chloroplatinic acids) are codeposited, or deposited seriatim, on carbon using the polar solvent, drying, and $H_2$-reduction, as described above. The co-deposited metals are preferably alloyed by heating in an inert atmosphere. This heating step can also bring about the desired increase in occurrence of (111) and (110) faces, particularly (111) faces. Again, the alloyed crystals (presumably cubo-octahedral in shape and containing both Pt and Au atoms) are enlarged by heating, but are still smaller than 15 nm (150 A). Any sintering or heating steps which result in the formation of polycrystalline metal should be avoided as much as possible.

The co-deposition or seriatim deposition of platinum and gold salts on a support material followed by reduction (in one step or after each deposition) can result in intimate mixtures which are macroscopically homogeneous, but are not preferred as "alloys" in the context of this invention. At least some amount of heating (e.g. to sintering temperatures or higher) is preferred for methanol oxidation catalysts, both to achieve microscopic homogeneity and to bring the supported metal particles into the optimum size range for (111) faceting, e.g. above 4 nm but less than 15 nm, preferably less than 10 nm. (As the particle size increases beyond 5 nm, the risk of forming polycrystalline particles, e.g. "blacks", increases. Typical Pt and Au "blacks" are in the size range of 10 to 20 nm.) For ethanol oxidation catalysts, the Pt/Au combination can be formed by any of these techniques, including co-deposition or seriatim deposition, alloying, or heterogeneous mixing. In the case of heterogeneous mixing, it is not essential that the platinum gold particles be the same size. The gold particles should be in the size range favoring (111) faces or faceting, but the platinum particles can be smaller or larger, if desired.

To form an intimate mixture suitable for heating to alloying and/or particle-enlarging temperatures, at least three approaches can be used: (1) co-deposition (including colloidal or electrochemical), (2) gold followed by platinum, and (3) platinum followed by gold.

In this invention, it is particularly preferred that the intimate mixture which is suitable for alloying and particle enlargement is obtained by electrochemical codeposition of gold and platinum (simultaneously or seriatim), most preferably by pulsed-current electrodeposition techniques. Specific advantages offered by pulse current electrodeposition are:

first, one can select a pulse waveform which provides high instantaneous current densities. High instantaneous current densities can help to control nucleation density and hence electrocatalyst dispersion.

Second, control over the on-time of the pulse current provides control over the growth of the nuclei (tiny, dispersed electrodeposits smaller than 40 Å) and thereby influence the particle size of the electrocatalyst deposits (prior to particle enlargement).

Third, the scientific literature suggests that electrodeposited alloys have beneficial properties not necessarily obtained by other techniques for providing intimate metallic mixtures. Moreover, in simultaneous codeposition of platinum and gold, pulse current can provide control over the composition (% Au, % Pt, etc.) of the nuclei (deposits).

Fourth, the pulse current electrodeposition technique can be used to maximize catalyst utilization. For a discussion of the pulse current electrochemical deposition of noble metals on a conductive substrate as a technique for optimizing catalyst utilization, see Reddy et al, U.S. patent application Ser. No. 07/560,206, filed Jul. 31, 1990, the disclosure of which is incorporated herein by reference.

In electrocatalysts of this invention, it is preferred that approximately equal amounts of Au and Pt atoms be present (e.g. 40–60 atomic % Au and 60–40 atomic % Pt), but wider ranges can be operative, e.g. 10–90 atomic % Au, 90–10 atomic % Pt. As noted above, platinum and gold form alloys in all proportions. It is preferred that the carbon-supported catalyst material contain less than 20 wt.-% Pt, e.g. 10 wt.-% or less.

Catalyst loadings on the electrodes can be in the range of 0.05 to 2.0 mg/cm² of catalytic metal, preferably <1.0 mg/cm² to save cost.

When optimized, the electricity generation method of this invention can produce >40 mW/cm² of electrode or even >50 mW/cm² of electrode, and the anode/s.p.e./cathode system works well at temperatures well below 80° C., e.g. at <65° C. The "cold start" properties of an s.p.e. cell permit utilization of fuel cells exposed to ambient temperatures below 0° C., thereby opening up possibilities for use of this invention to power automobiles, buses, and trucks or lorries.

Preferred s.p.e. electrolytes are disclosed in U.S. patent application Ser. No. 07/560,206, filed Jul. 31, 1990, the disclosure of which is incorporated by reference. These preferred s.p.e. electrolytes are ion-exchange polymers which are solid at room temperatures and have more than 3 repeating units. The polymers can be copolymers made from two, three, or even four different monomers. At least one of the monomers preferably is partially or fully fluorinated, contains at least one unsaturated site, and is provided with a pendant group terminated with an ionic or ionizable (e.g. acidic) radical. Particularly preferred monomers (and comonomers) include $$Z-CF(R_f)CF(R_f)O[CF(R_f)CF_2O]_nCR_f=CFR_f$$

and/or

and optionally as a comonomer,

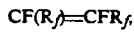

where Z is an acidic radical (e.g. $-SO_3H$, $-PO_3H_2$, $-COOH$, $-B(R_f)OH$, $-P(R_f)O_2H$, $-B(OR_f)OH$, etc.), the $R_f$ radicals, which are the same or different, are F, lower ($C_1-C_6$) perfluoroalkyl, or, less preferably, Cl, and n and m are numbers from 1 to 10.

If the electrolyte is liquid rather than solid, it can be an organic solution, e.g. a solution of ion-exchange polymer, as in U.S. Pat. No. 4,433,082 (Grot), issued Feb. 21, 1984, or, preferably, an aqueous electrolyte such as an aqueous mineral acid, e.g. phosphoric, sulfuric, or perchloric acid or the like. The lower alcohol "fuel" (methanol, ethanol, etc.) can be dissolved in the aqueous electrolyte, if desired, but it is preferred to feed the alcohol to the anode in vapor form.

From a cost standpoint, the preferred alcohol fuel is methanol, but ethanol is also of interest because of its lower toxicity and availability from biomass sources. Carbon dioxide produced from a biomass source (as opposed to a fossil source) does not contribute to the so-called "greenhouse effect", since one is simply returning to the atmosphere a quantity of $CO_2$ which had been recently extracted from it by plant matter. Other lower primary alcohols (e.g. 1-propanol, 1-butanol, and n-amyl alcohol) are technically operative but not preferred.

Methanol Electro-Oxidation on Various Gold Surfaces

The following data illustrate an important principle of this invention.

For purposes of cyclic voltammetry studies, methanol was dissolved in 1.0 M sulfuric acid to obtain a 0.5 M methanol solution. The cyclic voltammetry rotating disk electrodes used were provided with single-crystal Au (100), Au (110) and Au (111) as well as polycrystalline Au. Potential sweep rate and electrode rotation rate were 100 mV/sec and 2500 rpm, respectively. All measurements were made at room temperature (23° C.). Results with smooth gold and single crystal gold were compared to results with Pt.

The cyclic voltammogram on Pt was in good agreement with the literature, e.g. D. Pletcher et al, *Electrochimica Acta*, 27, 775–782 (1982). On the positive scan, a large oxidation peak is observed at 0.9 V, due to methanol oxidation. At more positive potentials, oxidation of Pt and then evolution of oxygen occur. On the negative scan, there is a peak at 0.7 V and a very strong oxidation peak at 0.65 V, probably due to partial oxidation of methanol on "fresh" reduced platinum.

Polycrystalline gold and Au (100) show little or no activity in cyclic voltammagrams. On the Au (111) surface, a strong methanol oxidation peak is observed in the positive scan, not unlike the peak seen with Pt. But in the negative scan the oxidation peak at 0.65 V is absent. Instead, a strong reduction peak is observed, beginning at about 0.7 V, suggesting that a uniquely "reversible" mechanism has been found in the case of Au (111).

Results observed for Au (110) are similar, but the activity is less.

In Table 1 below, the half wave potentials, peak current densities, and peak potentials for the above-described methanol electro-oxidation are summarized. In this Table, RHE refers to reversible hydrogen electrode.

TABLE 1

Half-Wave Potential, Peak Current Density, and Peak Potential for Methanol Oxidation in Sulfuric Acid Electrolyte on Pt, Au, Au (100), Au (111), and Au (110) Surfaces

| Surface | Half Wave Potential (V vs. RHE) | Peak Current Density (mA/cm$^2$) | Peak Potential (V vs. RHE) |
|---|---|---|---|
| Pt | 0.780 | 3.67 | 0.880 |
| Au | 0.660 | 0.036 | 0.880 |
| Au (100) | — | 0.00 | — |
| Au (111) | 0.780 | 2.91 | 0.870 |
| Au (110) | 0.780 | 2.20 | 0.840 |

What is claimed is:

1. A method for generating electricity in a fuel cell, said fuel cell comprising a cathode, an electrolyte, an anode comprising a first, fluid-permeable face and a second face in contact with the electrolyte, and an external circuit connecting said cathode and said anode, said method comprising:

bringing a lower primary alcohol into contact with said first fluid-permeable face of the anode, thereby permitting the lower primary alcohol to penetrate into the cross-section of the anode toward the second face, said second face including as an electrocatalyst a particulate alloy of essentially gold and a noble metal of Group VIII of the Periodic Table of the Elements, the particles of said particulate alloy having a crystalline character and having a major amount of exposed (111) crystalline faces or facets, oxidizing the lower primary alcohol essentially to carbon dioxide and water at said second face of the anode, reducing a reducible gas at the cathode, and obtaining electricity from said fuel cell.

2. A method according to claim 1, wherein said lower primary alcohol is methanol or ethanol.

3. A method according to claim 1, wherein the lower primary alcohol is in the vapor state when it is brought into contact with the fluid permeable face of the anode, said anode being a gas-diffusion electrode.

4. A method according to claim 1 wherein the particulate alloy comprises 10-90 atomic- % gold and 90-10 atomic- % platinum, and wherein the particulate alloy is supported on an electrically conductive support material.

5. A method according to claim 1 wherein the electrolyte is an acidic solid polymer electrolyte.

6. A method according to claim 1, wherein the reducible gas reduced at the cathode comprises oxygen, said cathode being a gas-diffusion electrode.

7. A method for generating electricity in a fuel cell, said fuel cell comprising a gas-diffusion cathode, an acidic solid polymer electrolyte, and, electrically connected by an external circuit to the cathode, a gas diffusion anode comprising a first, gas-permeable face and a second face in contact with the acidic solid polymer electrolyte, said method comprising:

bringing ethanol vapor into contact with said first, gas-permeable face of the anode, thereby permitting the ethanol vapor to penetrate into the cross-section of the anode toward the second face, said second face including as an electrocatalyst a metallic, particulate mixture of essentially gold and a noble metal of Group VIII of the Periodic Table of the Elements, the particles of gold in said mixture being crystalline in nature and having an average size of about 1.5 to 15 nanometers and having a major amount of exposed (111) crystalline faces, oxidizing the ethanol vapor essentially to carbon dioxide and water at said second face of the anode, reducing air or oxygen essentially to water at the cathode, and obtaining electricity from said fuel cell.

8. A method according to claim 7, wherein the noble metal of Group VIII is platinum.

9. A method according to claim 8, wherein said metallic, particulate mixture consists essentially of 10-90 atomic- % gold and 90-10 atomic- % platinum, and wherein the metallic particles of said metallic, particulate mixture are supported on a particulate, electrically conductive material.

* * * * *